United States Patent [19]

Braun et al.

[11] 4,319,783
[45] Mar. 16, 1982

[54] CONVEYING TROUGH CONNECTOR AND MINING MACHINE GUIDE RAIL BRIDGE

[75] Inventors: Ernst Braun; Gert Braun, both of Essen-Heisingen, Fed. Rep. of Germany

[73] Assignee: Halbach & Braun, Fed. Rep. of Germany

[21] Appl. No.: 167,642

[22] Filed: Jul. 11, 1980

[30] Foreign Application Priority Data

Jul. 11, 1979 [DE] Fed. Rep. of Germany ....... 2927965

[51] Int. Cl.³ ............................................. E21C 35/08
[52] U.S. Cl. ........................................ 299/43; 299/34
[58] Field of Search ....................... 299/34, 32, 43–46, 299/42

[56] References Cited

U.S. PATENT DOCUMENTS 3,897,108  7/1975  Krohm et al. ..................... 299/34
4,235,475  11/1980  Monks ............................. 299/43

FOREIGN PATENT DOCUMENTS 2509921  9/1976  Fed. Rep. of Germany ........ 299/43

Primary Examiner—Ernest R. Purser

Attorney, Agent, or Firm—McGlew and Tuttle

[57] ABSTRACT

A conveying trough for chain scraper conveyors, comprises a plurality of trough sections for the conveyance of the material each having side walls including a guide plate which has a portion adjacent an end thereof with a recess forming a pocket on the interior side of the guide plate. The guide plate has at least one projection extending into the pocket and a link plate is disposed in the pockets of adjacent plates and has eyelets into which the respective projections extend with a clearance between the guide plates and the link plate. A locking plate is arranged to overlie the link plate. Each guide plate is provided with a guide rail at its top which forms a surface defining a trackway for a wheel of a cutter or similar machine which runs over the conveying trough. The cutter has a hold-down member which engages beneath an inwardly extending claw portion of the guide rail and it has a slide surface which engages with a similar slide surface on the underside of the claw portion. The locking plate and the link plate form an insert bridge between adjacent sections and this insert bridge has a bridge rail section which runs between the guide rails.

5 Claims, 4 Drawing Figures

4,319,783

CONVEYING TROUGH CONNECTOR AND MINING MACHINE GUIDE RAIL BRIDGE

FIELD AND BACKGROUND OF THE INVENTION

This invention relates in general to conveyors and in particular to a new and useful conveyor trough for chain scraper conveyors which includes a plurality of interengaged trough sections.

The invention relates particularly to a conveying trough for chain scraper conveyors which are assembled of trough sections for the conveyed material connected to each other with a clearance of motion and provided with guide plates. The trough sections are equipped with connecting elements and the guide plates are provided on their inside, in the zone of their ends, with segmental projections. A common link plate is associated with every two neighboring guide plates to be latched to each other, and is provided with eyes separated by a web, for receiving the two segmental projections which are embraced by the link plate and confine the web extending therebetween to a predetermined clearance of motion. To be able to equip the trough sections with guide plates at the mine surface and to adapt the guide plates to serve as guideways for a cutter or another winning machine, the guide plates are adjusted, in accordance with an earlier patent application Ser. No. 116,234 of the applicant, as box sections having an upper running surface forming the track for the cutter.

The outer wall of the box extends by a predetermined distance beyond the segmental projections on the inside, and the associated ends of the plates form a butt gap in which the running surface is interrupted. The link plate embracing the segmental projections is lockable in position by means of locking plates which can be inserted with a predetermined clearance of motion therebetween, into the gap, to be flush with the surface of the link plate and the running surface, so that they form a track bridge in the area of the butt joint of two adjacent track plates.

In another, parallel disclosure by the applicant, it is provided that the guide plates do not form a running surface for a cutter directly, but that they support guide rails with an inwardly projecting guide claw whose top surface forms the track for the cutter wheel and whose underside is engaged from beneath by a hold-down member carried by the cutter and having a corresponding claw-like leg, so that the cutter cannot tilt upwardly and the sprocket wheels engaging a chain guide of the cutter are not loaded by tilting moments.

SUMMARY OF THE INVENTION

The invention is directed to an improved design of conveying troughs with preassembled guide plates and guide rails, facilitating the assembly or disassembly of the trough sections and, also ensuring a troublefree bridging of the joint between the guide rails.

In accordance with the invention a conveyor trough for chain scraper conveyors includes the plurality of trough sections for the conveyed material which are interconnected together. Each trough section has a side wall including a guide plate with a portion adjacent each end thereof with a recess forming a pocket on the inside thereof. At least one projection of the guide plate extends into the pocket and a link plate with an eyelet is inserted in the pockets of adjacent trough sections and the projection extends into the eyelet with sufficient clearance to permit some movement between the sections. A locking plate is arranged to overlie the link plate between adjacent trough sections. In addition, a guide rail is secured to the guide plates of each trough section and it includes a claw portion projecting inwardly of the sides of the trough section which defines a slide surface on its underside which is engaged by a hold-down member of a cutter or similar member which runs over the trough section. The cutter includes a wheel which is engagable on the surface of the claw portion which defines the track. The locking plate and the link plate form an insert bridge between adjacent trough sections and this bridge includes a bridge rail section which runs between the guide rails of adjacent sections.

The result of this design is that the two locking plates and the guide rail section form a constructional unit and can be put in place in the butt gap as a single-piece insert. The link plate is thereby latched over the segmental projections of the neighboring guide plates and, at the same time, the track formed by the guide rails secured to the guide plates is completed by the interposed guide rail section, so that a trouble free transition is obtained. The guide plates with the guide rails may thus be preassembled at the mine surface, and the link plates can then be engaged and locked by means of the single-piece insert underground.

Further substantial features of the invention may be pointed out as follows: The invention provides that below the guide rail section, the insert is provided on both sides with engagement shoulders and the ends of the associated guide plates are provided with corresponding engagement recesses, so that the insert is satisfactorily secured in position. Further, the insert may be designed with a downwardly narrowing leg portion permitting the insert to put in place easily. The insert is advantageously provided with contact projections, for example weld beads forming contact points at which the insert bears against the associated side walls of the trough, and ensuring a satisfactory contact as well as a reduced play. According to a development of the invention of particular importance, a horizontal plate covering the butt gap and supporting the guide rail section is provided, and the guide rail section is outwardly offset relative to the leg portion of the insert. The guide rail section and the cover plate thus form a guide recess into which the claw-like leg of the hold-down member carried by the cutter engages. This design also substantially prevents the coal fines from penetrating into the butt gap.

A substantial advantage of the invention is that a conveying trough particularly for a single-chain scraper conveyor which makes it possible to preassemble guide plates and guide rails secured thereto at the mine surface and to easily complete the assemblage underground by accomplishing the butt joints, with a bridging of the track by rail sections at the same time. Due to the inventive design, the assembly and disassembly of trough sections with preassembled guide plates and guide rails is considerably facilitated in general, since the element locking the link plate in position of engagement with the two segmental projections of the plate ends is a single-piece insert equipped with a guide rail section, and therefore, also serving as a bridge between the butt ends of the guide rails. A troublefree and relatively stable continuity in the butt joint areas of the trough sections is thereby obtained in a simple way improving the operation.

Accordingly it is an object of the invention to provide a conveying trough for chain scraper conveyors which is made up of a plurality of sections which are interconnected by link plates which engage over projections of guide rails forming pockets adjacent each end of the individual trough sections and which together with a backing or locking plate makes up an insert between trough sections which have a rail bridge therebetween bridging the rail structure formed on the side walls of the trough sections.

A further object of the invention is to provide a conveyor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
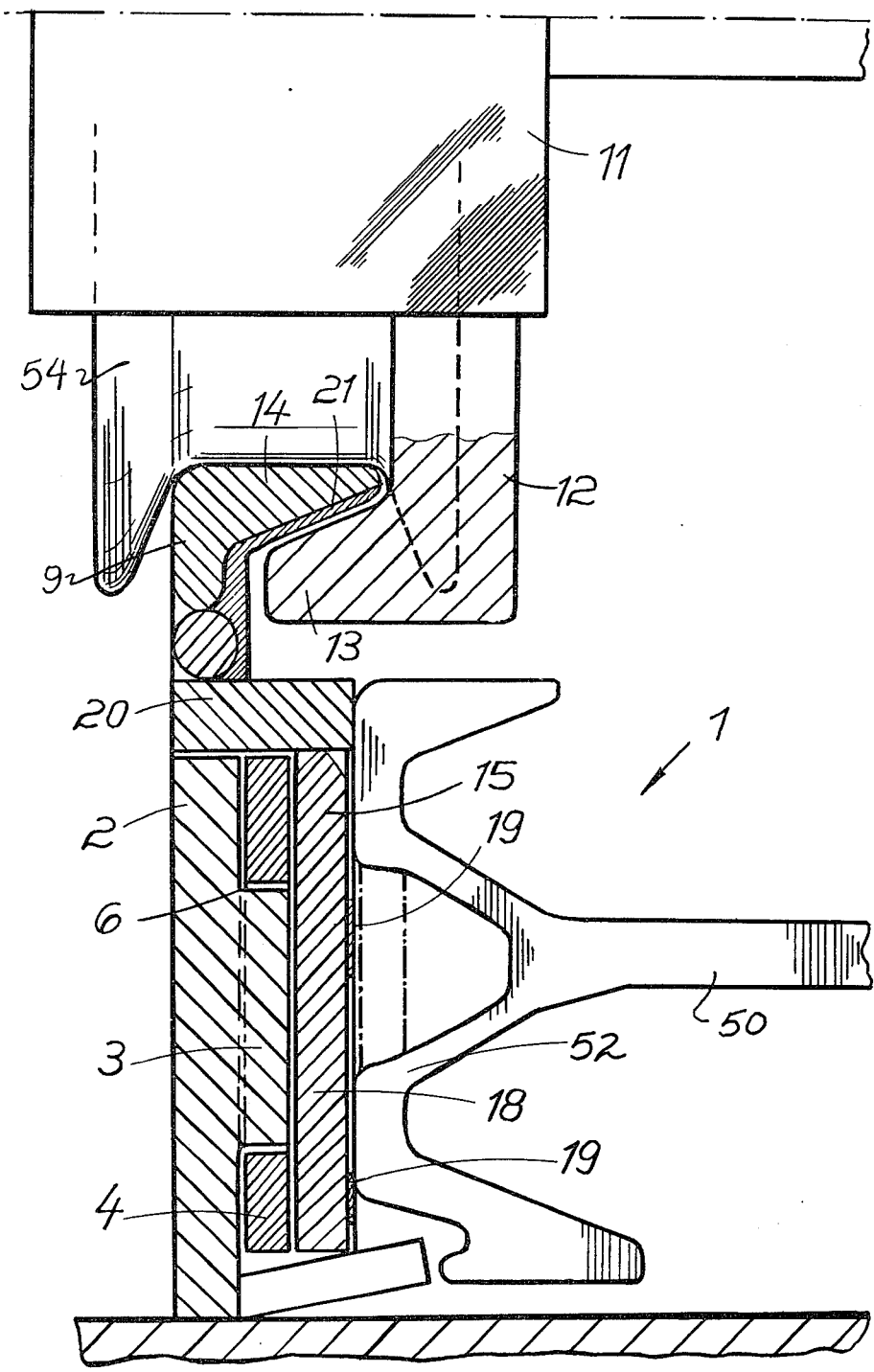
FIG. 1 is a partial transverse sectional view of a conveyor trough for chain scraper conveyors constructed in accordance with the invention.
Figure 2:
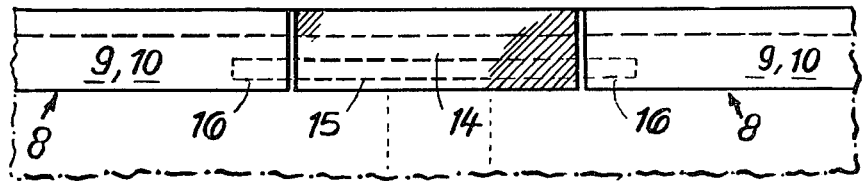
FIG. 2 is a partial top plan view of a conveyor trough shown in FIG. 1.
Figure 3:
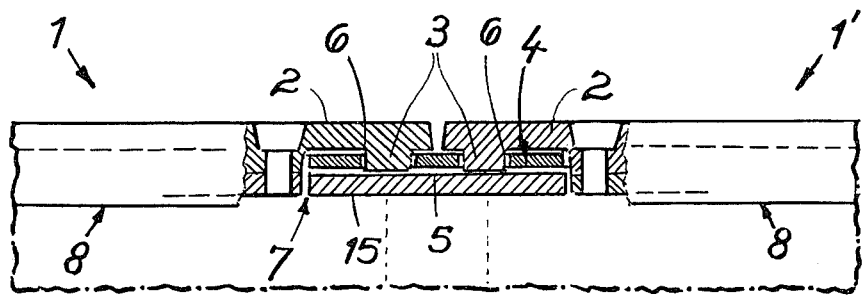
FIG. 3 is a partial horizontal sectional view showing two interconnected trough sections similar to FIG. 2.
Figure 4:
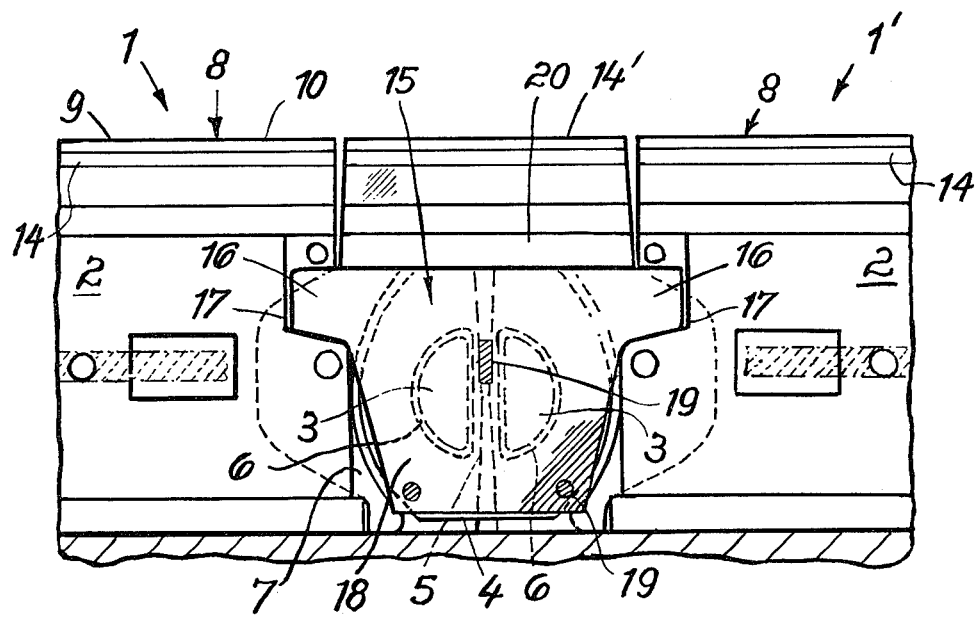
FIG. 4 is a side elevational view of the trough section shown in FIG. 1.

Referring to the drawings in particular the invention embodied therein comprises a conveyor trough section for a chain scraper conveyor which comprise a plurality of trough sections, 1, 1', etc. which are connected together to form a complete conveyor. In the embodiment illustrated each trough section includes a conveyor trough having a central floor portion 50 with side walls generally designated 52 at each side which include or which are secured to guide plates 2, each guide plate 2 of each trough section has a portion adjacent preferably each end thereof with a recess forming a pocket or gap 7 on the interior side thereof. Each guide plate 2 includes a projection 3 adjacent its end which extends into the pocket and it is embraced in an eyelet 6 of a link plate 4 which is disposed in the pockets of adjacent plates, web portions 5 of the link plate 4 engage in the eyelets with a clearance between link plate and the guide rail of the associated conveying trough. A locking plate or insert forming member 15 overlies the link plate 4 on its inside. Each guide rail as well as insert 15 is provided with a guide rail section 14 forming a surface on which the wheel 54 of a running machine such as a cutter 11 moves over. The insert 15 in addition provides a bridge guide rail 14' which bridges guide rail portions 14, 14 of adjacent trough sections 1 and 1'.

The figures show a conveying trough assembled of trough sections 1 which are connected to each other with a clearance of motion and equipped with guide plates 2 for the material to be conveyed. Trough sections 1 are provided with elements for connecting the sections, and guide plates 2 are provided at their ends with inwardly extending segmental projections 3. Every two neighboring segmental projections 3 of two guide plates 2 to be latched together are associated with a common link plate 4 which is provided with eyes 6 separated by webs 5 and intended to receive the two segmental projections 3. In an assembled position, link plate 4 embraces eyes 6 and its webs 5 are confined between projections 3 with a predetermined clearance of motion.

In the zone of the guide plate ends and the associated trough walls, a butt pocket or gap 7 is formed in which the running surfaces or tracks are interrupted. Link plate 4 is lockable in position by means of locking plates 15 which can be inserted into the gap 7 and form a track bridge in the area of the butt joint of adjacent guide plates 2. Guide rails 8 are provided with a guide claw 9 which projects to the inside of the trough and is secured to a respective guide plate 2. The top side of guide claw 9 forms a running surface 10 for the track wheel of a cutter 11 or another winning machine (not shown). The underside of guide claw 9 is engaged from below by a holddown member 12 which is secured to the cutter 11 and has a corresponding claw-like leg 13. The two link plates, along with a guide rail section 14 of guide claw 9 form a track bridge between the respective butt ends of neighboring guide rails 8 and all form a single piece insert 15 between adjacent trough sections 1 and 1'. Below guide rail section 14, insert 15 is provided on both sides with engagement shoulders 16, while corresponding engagement recess 17 are provided in the end portions of associated guide plates 2. Insert 15 is designed with a downwardly narrowing leg portion 18 carrying contact projections 19, for example weld beads, through which the insert bears against the associated walls of the trough. A horizontal plate 20 covering butt gap 7 is interposed between guide rail section 14 and the insert, and the guide rail section supported on cover plate 20 is outwardly offset relative to leg portion 18 and provided, on its inside, with a plated and ground slide-coating 21 cooperating with the claw-like leg 13 of hold-down member 12 of the cutter.

The walls 52 of the trough section 1 include side walls having a surface engageable by contact projections 15 which are formed on the plate portions 18 of the inserts 15.

While specific embodiments of the invention have been shown and described in detail to illustrate the application of the principles of the invention, it will be understood that the invention may be embodied otherwise without departing from such principles.

What is claimed is:

1. A conveying trough for chain scraper conveyors, comprising a plurality of trough sections for the conveyed material each having a side wall including a guide plate with a portion adjacent an end thereof with a recess on its interior forming a pocket, said guide plate having at least one projection extending into said pocket, a link plate disposed in the pockets of adjacent guide plates of adjacent trough sections and having eylets into which said projections extend with clearance between said projections and said link plate, a locking plate overlying said link plate on its interior, a guide rail secured to said guide plates of each trough section and each having a claw portion projecting inwardly of the sides of said guide rail and defining a slide surface on its underside and having a top surface forming a trackway, a machine overlying said trough section having a member adapted to run over said trackway and a hold-down member engageable beneath said slide surface, said locking plate with said link plate forming an insert bridge between adjacent trough sections, said insert bridge having a bridge rail section running between said guide rails.

2. A conveyor according to claim 1 wherein said insert includes a shoulder portion on each side, each adjacent guide rail having a recess opposing the recess of the adjacent guide rail into which said shoulder extends.

3. A conveyor trough according to claim 1 wherein said insert includes a leg portion extending between said guide rails which is formed with downwardly converging side walls.

4. A conveyor trough according to claim 1 wherein said insert bridge includes contact projections bearing against the associated walls of said trough.

5. A conveyor trough according to claim 1 including a horizontal cover plate extending over said guide plates, said guide rails being disposed over said plate.

* * * * *